United States Patent Office 3,400,399
Patented Sept. 3, 1968

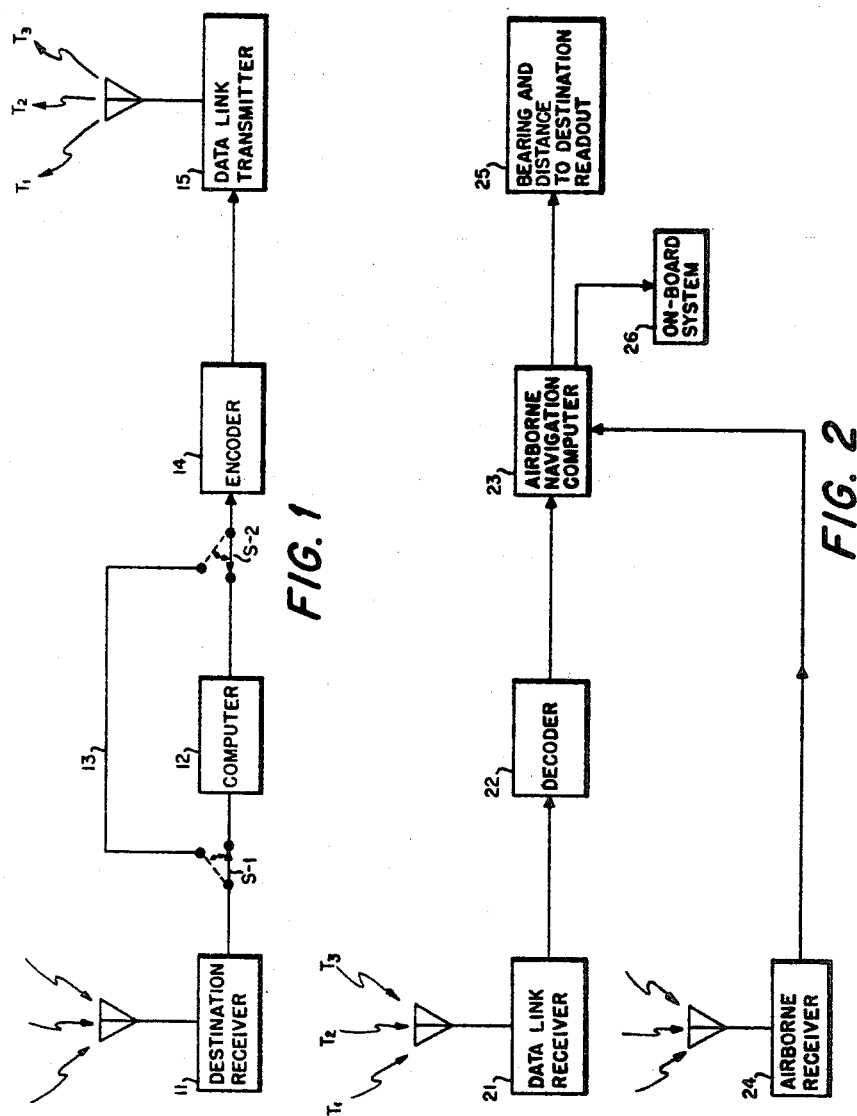

3,400,399
SYSTEM AND METHOD FOR OBTAINING ACCURATE TACTICAL NAVIGATION
Evans L. Kline, Alexandria, Va., assignor to the United States of America as represented by the Secretary of the Navy
Filed Dec. 29, 1966, Ser. No. 605,940
15 Claims. (Cl. 343—112)

ABSTRACT OF THE DISCLOSURE

A tactical navigation system wherein information regarding the position of a destination area or vehicle is transmitted to an airborne vehicle which compares its position with that of the destination to result in the display of bearing and distance information to the destination or to generate steering commands to be used by the aircraft.

---

The invention described herein may be manufactured and used by or for the Government of the United States of America for Governmental purposes without the payment of any royalties thereon or therefor.

The present invention relates to navigation systems and more particularly to a tactical navigation system wherein a destination, such as a fixed shore location, a moving vessel or an aircraft, determines its position or an offset position which is a point at a predetermined range and bearing from the short location, vessel or aircraft and transmits this position information to a using vehicle which is capable of determining its respective position. The positions of the destination or offset and of the using vehicle are then compared to provide bearing and distance information from the using vehicle to the destination or offset position.

In the field of tactical navigation systems it has been the general practice to employ systems, e.g., the TACAN system, to provide an aircraft or using vehicle with bearing and distance information to a destination, which is stationary or moving. Although such devices have served the purpose they have not proved entirely satisfactory under all conditions of service for the reason that the aircraft's or using vehicle's equipment, in addition to the destination equipment, must be active in order to obtain the desired bearing and distance information. As a result, the TACAN system does not provide for any means of security with respect to the aircraft or using vehicle.

The omega navigation system is a very-long-range radio navigation system operating in the very-low-frequency portion of the radio spectrum, and operates by the measurement of the phase of the propagated signal transmitted by various land-based transmitters. Propagation studies of the system have indicated that fixes with an accuracy of one mile or less are possible anywhere on earth with aircraft, surface ships or submerged submarines by employing only six to eight land-based transmitting stations. The characteristics and operation of a complete omega system are given in detail in Proceedings of the Institute of Radio Engineers, vol. 47, No. 5, May 1959, pages 829–839, by C. J. Casselman et al., and no further explanation of the details of the omega system are herein included.

The loran systems (A, C and D) operate in either a time difference between pulse (loran A) or in a time difference and phase measurement mode (loran C and D). The various loran systems are generally considered either medium base line or short base line systems, and feature good accuracy within their operational areas but do not provide world-wide coverage. In areas where good loran coverage is provided, the omega system affords no operational advantage, but a disadvantage of loran systems is the large number of transmitting devices that are necessary to provide coverage for a large area. In a tactical sense the use of short base line loran necessitates the installation of transmitting sites in close proximity to an operational area which may be a disadvantage. The inertial and Doppler radar systems known in the art theoretically provide a worldwide navigation capability; however, the present state-of-the-art has limited the long-term accuracy that can be achieved with these systems, since the error of these systems increases with time. An additional disadvantage inherent in the Doppler system, as in the TACAN system, is the necessity for the using vehicle or aircraft to actively transmit R–F energy, thereby possibly comprising its position.

Although the subject matter of the instant invention could be incorporated in these other navigation systems, the discussion herein will be limited to its application to the omega navigation system for the sake of clarity and also because the omega navigation system possesses those characteristics which make it a most desirable system.

Much has been said in the prior art about the worldwide capability of the omega navigation system, but relatively little has been said about the possible tactical applications of the system. Accordingly, the general purpose of this invention is to provide a tactical navigation system which embraces all the advantages of similarly employed systems and possesses none of the aforedescribed disadvantages.

To obtain this the present invention contemplates the automatic insertion into an aircraft computer of information regarding destination position by means of a one-way data link which enables the aircraft computer to compare destination position with aircraft position to result in bearing-and-distance-to-destination information. The destination referred to can be a fixed shore located, a moving vessel or another aircraft; and the destination equipment will have the capability of determining its position or an offset position, which is a point at a predetermined range and bearing from the destination equipment, by means of the omega or other navigation systems. The information thus obtained from the destination equipment, i.e., destination position information, will then be transmitted by means of a one-way data link to the using aircraft. The information transmitted can be in the form of raw omega data, if the omega system is used, or can be converted into latitude and longitude information. When using the system of this invention it is, therefore, only necessary for a one-way data link to exist from the destination to the using vehicle, e.g. an aircraft; and the aircraft need only have a knowledge of the frequency and coding of the data link. Among the advantages of this system over prior art systems is the fact that the only equipment necessary on the using aircraft is a data link receiver and computer thereby minimizing power and weight requirements. The use of this system is also advantageous in the sense that using vehicle or aircraft remains passive and its position is thus made secure.

An object of the present invention, therefore, is the provision of a tactical navigation system that can be used with known navigation systems to greatly expand their operational capabilities.

Other objects and features of the invention will become apparent to those skilled in the art as the disclosure is made in the following description of a preferred embodiment of the invention as illustrated in the accompanying drawings in which:

FIG. 1 shows a block diagram of the destination equipment of this invention; and FIG. 2 illustrates a block diagram of the using vehicle or aircraft equipment.

Referring now to the drawings there is shown in FIG. 1 the destination equipment which may be at a fixed surface location, on a shipboard facility or an airborne facility. This destination equipment includes a destination receiver 11 which continuously tracks the position of the destination site, and if the omega system is used the position is tracked in omega coordinants, as described by C. J. Casselman et al., in the Proceedings of the Institute of Radio Engineers, vol. 47, No. 5, May 1959, pps. 829–839. The omega data is then processed through computer 12 if it is desired to change the omega data to data in terms of latitude and longitude or if it is desired to determine an offset position. In the event that it is desired to retain the omega data in that form switches S–1 and S–2 may be placed in contact with bypass line 13 so as to bypass the computer 12. The data is then processed and encoded by encoder 14 in order to place the data into a form suitable for transmission by the data link transmitter 15. The data link transmitter 15, in turn, transmits this encoded destination or offset position information to the data link receiver 21 located in the using vehicle or aircraft.

FIG. 2 shows the equipment of the using vehicle or aircraft wherein two passive receivers are utilized. The information from data link transmitter 15, as shown in FIG. 1, is received by data link receiver 21 and is then decoded by decoder 22. The output of decoder 22, in turn, is then used as the destination input to the airborne navigation computer 23. At the same time airborne receiver 24 continually tracks the position of the using vehicle or aircraft, and if the omega system is used this is accomplished in a manner described by the article of C. J. Casselman et al., supra. This information regarding the using vehicles' position is then used as a second input to the airborne navigation computer 23.

The airborne navigation computer 23 may be any one of a number of known computers, e.g., the Minac 5 AN/ASN-41 of the Kearfott Division of General Precision Aerospace-General Precision, Inc., or the Univac CP–823/U. This computer then compares the information received from the data link receiver 21, regarding destination or offset position, with the information received from airborne receiver 24, regarding the using vehicle's or aircraft's position, and displays the resulting bearing and distance to the destination or offset position readout 25. Alternatively or additionally, the airborne navigation computer 23 can generate commands for the use of such on board systems as an automatic pilot 26.

It can be seen that by the use of this invention the tactical capabilities of the omega navigation system and other navigation systems to which this invention is equally applicable are greatly expanded. In air-to-air refueling operations the use of this tactical navigation system greatly facilitates rendezvous wherein the tanker aircraft transmits the coded data link containing the position information of the tanker aircraft based on omega information. The aircraft to be refueled uses this information derived from the data link as the destination point. Similarly, the use of this tactical navigation system would greatly facilitate ASW operations where it may be necessary for all vehicles in the operation to maintain position relative to each other or where rendezvous between vehicles is desired. Additionally, it is important to note that by using the system of this invention for tactical navigation purposes the necessity of correction for propagation variations due to diurnal shift is eliminated because all vehicles concerned operate in the same relative frame of reference, e.g., the diurnal shift is not a factor which must be considered. By using the system of this invention the security of using vehicles is maintained since their role remains a passive one, and where the omega system is used in conjunction with this invention a worldwide capability is achieved for tactical navigation. Further, by encoding the information sent from the destination via the data link transmitter the information with respect to destination position is made secure.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A method of accurate tactical navigation, comprising:
   automatically determining the continuous and instantaneous position of a destination;
   automatically determining the continuous and instantaneous position of a using vehicle;
   transmitting information with respect to the position of said destination from said destination to said using vehicle; and
   comparing the position of said destination with the position of said using vehicle.

2. The method of claim 1 including the step of selectively converting said information from one form to a different form.

3. The method of claim 2 including the step of encoding said information for the purpose of security.

4. The method of claim 3 including the step of decoding said information after it is received at the using vehicle.

5. The method of claim 4 including the step of automatically providing information regarding the bearing and distance to said destination from said using vehicle.

6. The method of claim 4 including the step of automatically generating bearing and distance commands for use by an automatic pilot of said using vehicle.

7. The method of claim 1 wherein the automatic determination of the geographical position of said destination and said using vehicle is accomplished by means of the omega navigation system.

8. An accurate tactical navigation system comprising:
   a first means located at a destination for automatically and continuously determining the position of the destination;
   a second means at a using vehicle for automatically and continuously determining the position of the using vehicle;
   means associated with said first means for transmitting position information of said destination to said using vehicle;
   passive means associated with said using vehicle for receiving the position information of said destination; and
   means associated with said second means and said passive means for automatically comparing the position of said destination with the position of said using vehicle.

9. The system of claim 8 including a computer selectively associated with said first means and said transmitting means to convert the position information of said destination from one form to a different form.

10. The system of claim 9 including encoding means associated with said first means and said transmitting means to encode the position information of said destination for the purpose of security.

11. The system of claim 10 including decoding means associated with said passive means and said comparing means to decode the position information of said destination.

12. The system of claim 8 wherein said comparing means provides bearing and distance to said destination from said using vehicle.

13. The system of claim 12 including display means associated with said comparing means to visually display the bearing and distance to said destination from said using vehicle.

14. The system of claim 12 including automatic pilot means selectively associated with said comparing means to guide the using vehicle toward the destination based on the bearing and distance information provided by said comparing means.

15. An accurate tactical navigation system comprising:
first means located at a destination for automatically and continuously determining the position of the destination;
second means at a using vehicle for automatically and continuously determining the position of the using vehicle;
means associated with said first means for transmitting position information of said destination to a using vehicle; and
means operatively associated with said second means and said transmitting means for comparing the positions of said destination and said using vehicle and for determining the bearing and distance to said destination from said using vehicle.

References Cited

UNITED STATES PATENTS

| | | |
|---|---|---|
| 3,090,958 | 5/1963 | Brown. |
| 3,091,764 | 5/1963 | Tatel. |
| 3,156,435 | 11/1964 | Norton et al. _____ 244—3.14 |
| 3,161,880 | 12/1964 | Swanson et al. _____ 343—105 |
| 3,320,611 | 5/1967 | Sekimoto et al. _____ 343—6.5 |

RODNEY D. BENNETT, *Primary Examiner.*

RICHARD E. BERGER, *Assistant Examiner.*